US006102648A

United States Patent [19]

Fretwell et al.

[11] Patent Number: 6,102,648

[45] Date of Patent: Aug. 15, 2000

[54] DRIVING MECHANISM FOR VEHICLE LIFTS

[75] Inventors: Percy Fretwell, Bury, United Kingdom; Dante Vincent DeLeo, Tarzana, Calif.

[73] Assignee: Ricon Corporation, Panorama City, Calif.

[21] Appl. No.: 08/924,782

[22] Filed: Sep. 5, 1997

[51] Int. Cl.[7] ........ B60P 1/44

[52] U.S. Cl. ........ 414/540; 14/69.5; 414/921; 414/556; 414/558; 414/522

[58] Field of Search ........ 14/69.5, 71.1, 14/71.3; 414/539, 921, 917, 540, 541, 522, 545, 546, 549, 552, 553, 554, 556, 557, 558; 105/29.1, 433, 449; 254/10 R, 10 C, DIG. 6

[56] References Cited

U.S. PATENT DOCUMENTS

| | | | |
|---|---|---|---|
| 4,058,228 | 11/1977 | Hall . | |
| 4,134,504 | 1/1979 | Salas et al. . | |
| 4,909,700 | 3/1990 | Fontecchio et al. . | |
| 4,958,979 | 9/1990 | Svensson . | |
| 5,110,252 | 5/1992 | Aoki | 414/921 X |
| 5,111,912 | 5/1992 | Kempf . | |
| 5,305,486 | 4/1994 | Smith et al. | 414/921 X |
| 5,865,593 | 2/1999 | Cohn | 414/921 X |

*Primary Examiner*—Frank E. Werner

*Attorney, Agent, or Firm*—Thomas I. Rozsa; Tony D. Chen; Jerry Fong

[57] ABSTRACT

A vehicle lift for use in conjunction with a vehicle to facilitate passengers boarding and leaving the vehicle. The vehicle lift has an improved driving mechanism for moving a platform between a stowed position to a deployed position. The driving mechanism includes a bidirectional motor which is mechanically coupled to a gear box which in turn is coupled to a pinion that is connected to a main sprocket. A longitudinal bracket is affixed to the underside of a top panel of the mounting enclosure and is located parallel to a longitudinal guide bar. At both ends of the longitudinal bracket are sprockets which are coupled by a loop chain. Accordingly, engaging the main sprocket with the loop chain moves the traveling assembly inward or outward with respect to the vehicle. The chain is immobilized by a manual spring biased locking mechanism to prevent the chain from moving linearly along the bracket. Therefore, when the motor is energized, it actuates the gear box which in turn drives the pinion, which in turn rotates the main sprocket to linearly travel on the chain moving the platform to a deployed position and visa verse.

19 Claims, 5 Drawing Sheets

DRIVING MECHANISM FOR VEHICLE LIFTS

BACKGROUND OF THE INVENTION

1. Field of the Invention

The present invention generally relates to the field of vehicle lifts which enable persons who are physically challenged or otherwise have limited mobility to board and leave a bus or a vehicle. More particularly, the present invention relates to the field of vehicle lifts which have improved driving mechanisms for moving a platform between retracted (stowed) and extended (deployed) positions.

2. Description of the Prior Art

Vehicle lifts are widely used for enabling persons who are physically challenged or otherwise have limited mobility to board and leave vehicles, such as a bus. Generally, considerations relative to an effective vehicle lift have included safety, ease of use, economy, space requirements and durability. Although a variety of mechanisms and structures have been introduced, a need has continued for an improved lift to transport persons who are physically challenged or otherwise have limited mobility to board and leave the vehicle.

One of the prior art vehicle lifts includes a platform carriage, horizontally movable between a stowed position within a vehicle and a deployed position outboard of the vehicle. The platform carriage is typically extended or retracted by a driving mechanism which may be on both sides of the platform carriage and arranged in a vertical plane arrangement. A platform located in the carriage is mounted to swing in an arcuate path for lifting and lowering physically challenged persons between ground level and the floor level of the vehicle.

U.S. Pat. No. 4,058,228 issued to Hall on Nov. 15, 1997 discloses a passenger vehicle access stair and elevator apparatus. The platform extends and retracts by a conventional prior art drive mechanism which includes a chain and sprocket drive means mounted in a vertical plane arrangement.

U.S. Pat. No. 4,134,504 issued to Salas et al. on Jan. 16, 1979 discloses a lift for a wheelchair. The platform extends and retracts by a cable drive means which is mounted in a vertical plane arrangement.

U.S. Pat. No. 4,909,700 issued to Fontecchio et al. on Mar. 20, 1990 discloses a lift for a wheelchair. It comprises stationary track members which are attached to a vehicle, and frame members slidably mounted within the track members, where the frame members extend or retract from the vehicle by use of a pair of worm gears. A pair of hydraulic cylinders interconnect the platform and the frame members using four links which raise and lower the platform. The worm gears are mounted in a vertical plane arrangement.

U.S. Pat. No. 4,958,979 issued to Svensson on Sep. 25, 1990 discloses an arrangement for a lift adapted to a motor vehicle. It comprises a lifting platform capable of moving between the vehicle and a floor. The lifting platform is attached by a scissors mechanism to a source of power for the platform, so that the platform, upon actuation of the power source, moves between a lower and an upper position.

U.S. Pat. No. 5,111,912 issued to Kempf on May 12, 1992 discloses a spring loaded drive assembly for a wheelchair lift. The drive assembly includes a set of linkage arms connected between the platform and a stable carriage arm. A pair of sprockets are connected to the carriage arm at the linkage arm pivot points and control the rotation of the linkage arms and the movement of the platform relative to the carriage arm. The sprockets are connected together by a leaf chain assembly so as to slow rotation of sprockets in a simultaneous movement of the arms. The drive assembly is mounted in a vertical plane arrangement.

One of the inventors and a co-applicant of the present invention is also the patentee of U.S. Pat. No. 5,253,973 issued on Oct. 19, 1993 for "Vehicles And Vehicle Lifts" (hereafter the "'973 Patent") and U.S. Pat. No. 5,556,250 issued on Sep. 17, 1996 for "Vehicle Lifts" (hereafter the "'250 Patent"). While the patentee's prior art vehicle lifts function adequately, the patentee has continuously sought to further improve his products for persons who are physical challenged or otherwise have limited mobility to board and leave a vehicle.

The '973 Patent discloses a lift for attachment to a vehicle for moving mobility-impaired passengers between lowered and raised positions for entry and exit. A platform is affixed to an unequal modified parallelogram structure and supported on movable rails and is carried by rollers for movement between extended and retracted positions by a driving assembly. The driving assembly is mounted in a vertical plane arrangement.

The '250 Patent discloses a vehicle lift which comprises a drive mechanism which is mounted in a vertical plane arrangement.

Prior art lifts as described above have been useful and effective, however, as indicated, the need for improvement has continued. It is highly desirable to provide a very efficient and also effective design and construction of a horizontally movable mechanism that is capable of smooth motion without binding or catching between the stowage and deployed positions. It is desirable to provide an improved driving mechanism mounted in a horizontal plane arrangement which is more compact than the existing vertical arrangement. It is also desirable to provide an improved driving mechanism to be able to move the lift platform either electrically or manually between the stow position and the deployed position. In addition, it is desirable to provide an effective alignment of the platform for stowage.

SUMMARY OF THE INVENTION

The present invention is a vehicle lift with an improved driving mechanism for moving a platform between a stowed position to a deployed position.

Described generally, the present invention is a vehicle lift for use in conjunction with a vehicle to facilitate passengers boarding and leaving the vehicle. The vehicle lift includes a traveling assembly comprising a carriage, an elevating frame and a platform, horizontally moveable relative to a vehicle between a stowed position and a deployed position. The traveling assembly is received for stowage in a mounting enclosure which is attached to the vehicle. As part of the traveling assembly, a parallelogram lifting arrangement including pivotal connections is fixed between platform and the carriage. An improved driving mechanism extends and retracts the carriage and the platform within the mounting enclosure.

The driving mechanism includes an electrical bidirectional motor which is mechanically coupled to a gear box which in turn is coupled to a pinion that is connected to a main sprocket. A longitudinal bracket is affixed to the underside of the top panel of the mounting enclosure and is located parallel to a longitudinal guide bar. At both ends of the longitudinal bracket are sprockets which are coupled by a loop chain which is arranged in a horizontal plane. The chain is immobilized by a manual spring biased locking mechanism to prevent the chain from moving linearly along the bracket. Accordingly, engaging the main sprocket with the loop chain moves the traveling assembly inward or outward with respect to the vehicle. Therefore, when the motor is energized, it actuates the gear box which in turn drives the pinion, which in turn rotates the main sprocket to linearly travel on the chain moving the traveling assembly to a deployed position. The motor may be energized to revolve in either direction to move the traveling assembly between deployed and stowed positions.

As part of the traveling assembly, a parallelogram lifting arrangement including pivotal connections is fixed between the platform and the carriage. An actuating mechanism raises and lowers the platform as it travels an arcuate path. Specifically, as disclosed, the actuating mechanism is connected to the parallelogram lifting arrangement which is connected to the upper pivot. The parallelogram lifting arrangement may change the inclination of the platform as it is raised or lowered. That is, when the platform is raised or lowered by the parallelogram lifting arrangement, the inclination of the platform changes with reference to the horizontal.

The present invention further provides a vehicle lift including a traveling assembly movable on lateral rails each comprising an elongate guide rail spaced from a support and engageable by cam followers.

The present invention vehicle lift has many advantageous features. One of the advantages of the present invention vehicle lift is that it provides for manual operation for deploying and stowing the platform. Another advantage of the present invention vehicle lift is that it does not require a clutch assembly. A further advantage of the present invention vehicle lift is that the improved driving mechanism is compact, where the loop chain is mounted in a horizontal plane arrangement.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
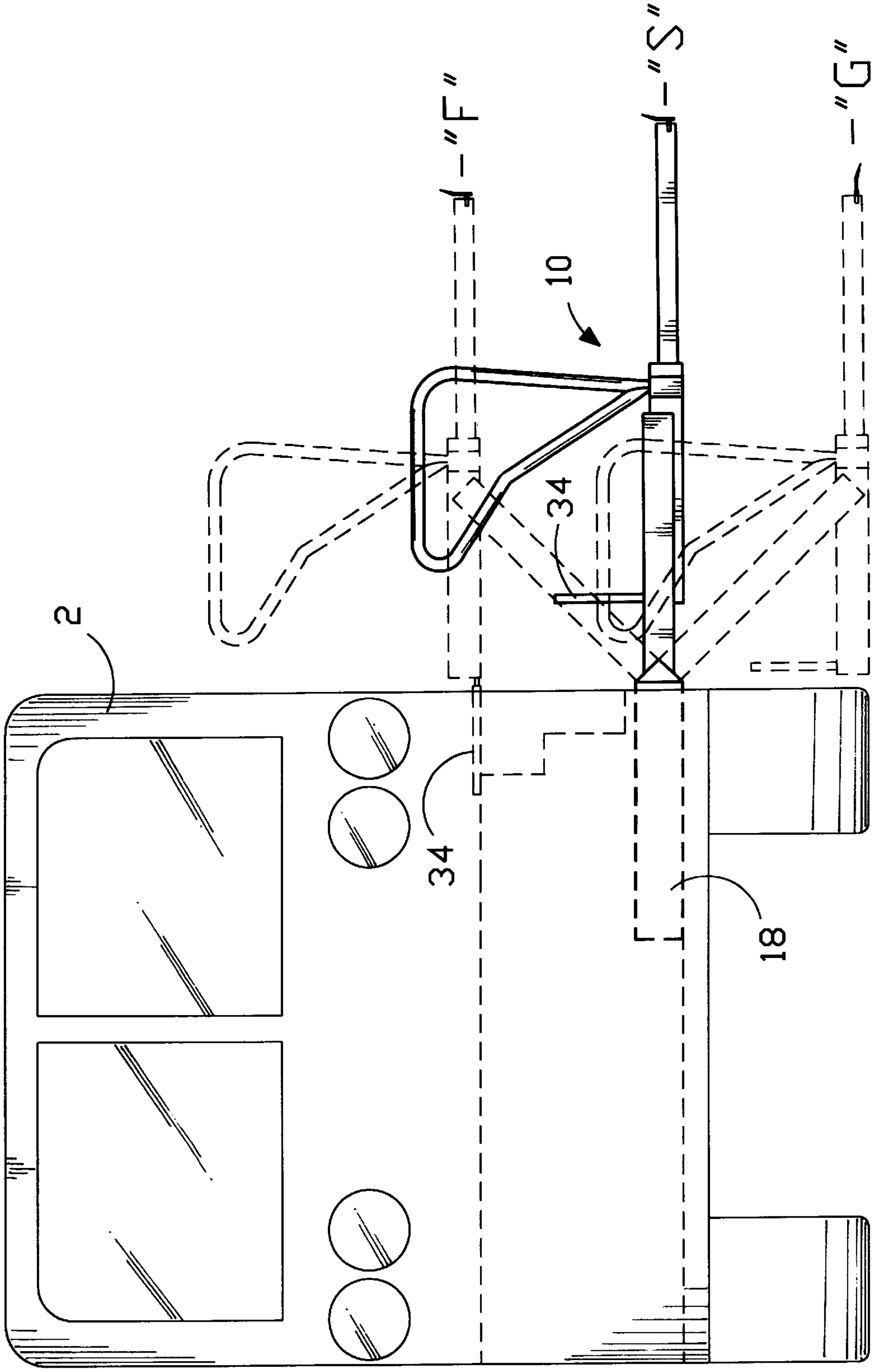
FIG. 1 is a simplified side elevational view of a vehicle incorporating a lift in accordance herewith and showing the lift in various operating positions.

Referring to FIG. 1, there is illustrated a bus type vehicle 2 with the present invention vehicle lift 10 mounted underneath the traditional access door (not shown) of the bus 2. The vehicle lift 10 is illustrated in various operating positions which include a ground level "G", a stow level "S", and a floor level "F". The floor and ground levels are designated in dashed lines as shown.

Figure 2:
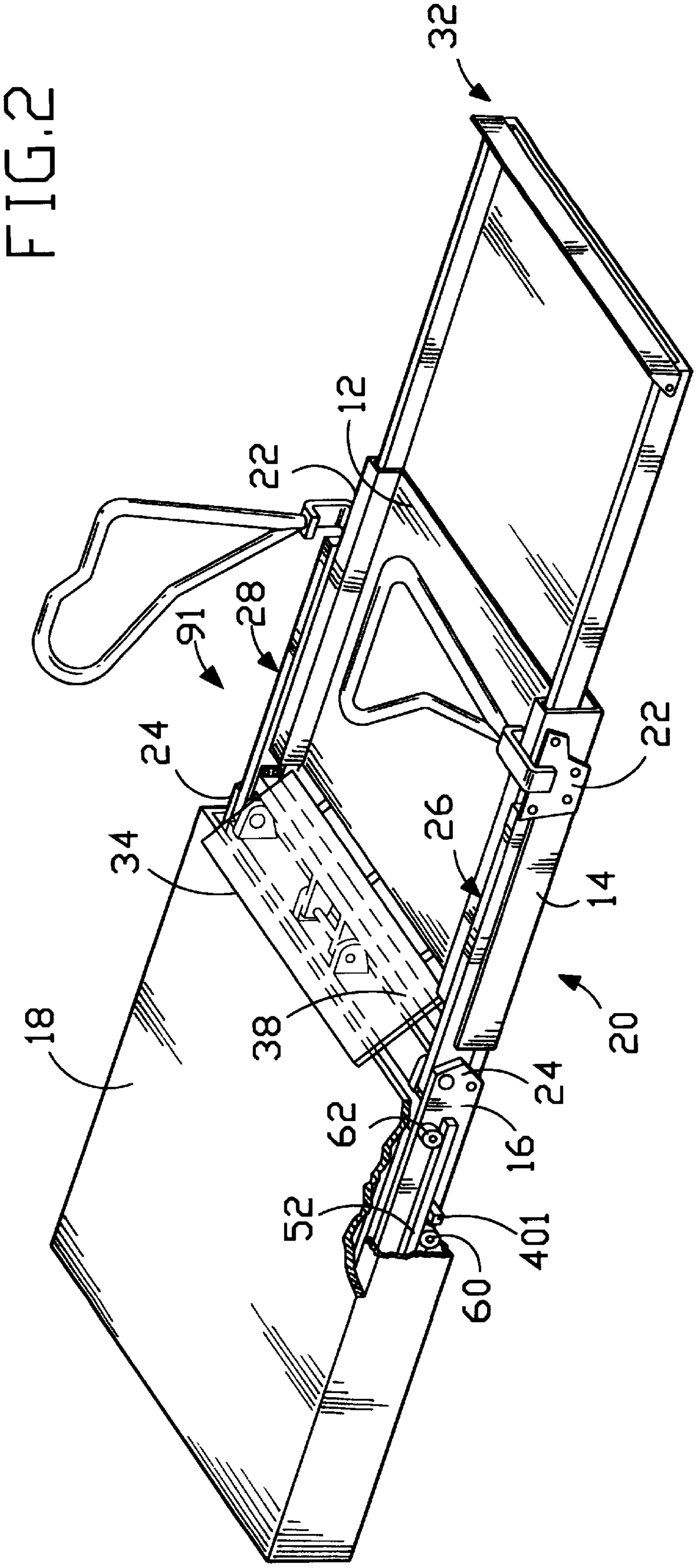
FIG. 2 is a perspective view of the present invention vehicle lift illustrated in FIG. 1 with the platform in a fully deployed position.

Referring to FIGS. 1 and 2, the vehicle lift 10 comprises a main platform 12, an elevating frame 14, a carriage assembly 16, and a cassette type mounting enclosure 18. Generally, the vehicle lift 10 incorporates the platform 12 shown in solid lines at the stow level "S" (see FIG. 1). The platform 12 is pivotally connected to the elevating frame 14 which is in turn pivotally connected to the carriage assembly 16. With the carriage assembly 16 supported by the cassette type mounting enclosure 18, the elevating frame 14 may be actuated to swing the main platform 12 in an arcuate path (not shown) from the position shown in solid lines to a raised position (floor level "F") or lower position (ground level "G") indicated in dashed lines (see FIG. 1). From the lower position, approximately the ground level of the vehicle 2, a wheelchair can be rolled onto the platform 12. From the raised position, approximating the floor level of the vehicle 2, the wheelchair can be rolled into and out of the vehicle 2.

Referring to FIG. 2, an inner platform 13 which is slightly smaller than the main platform 12 is provided with the present invention vehicle lift 10. The inner platform 13 is slidably assembled within the main platform 12, where the inner platform 13 may be manually actuated by grasping a handle (not shown) which is attached to the inner platform 13 and sliding the inner platform 13 out from the main platform 12 to be utilized. It will be appreciated that the present invention vehicle lift 10 may be assembled with or without the inner platform 13.

The main platform 12, along with the elevating frame 14 and the carriage assembly 16 is movable horizontally as a traveling assembly 20 with respect to the vehicle 2 to be deployed for use or stowed in the mounting enclosure 18. The platform 12 moves in an up-and-down motion in the arcuate path to embrace three terminal positions, i.e., ground level, vehicle floor level and stowage level. From the stowage level, the aligned platform 12, along with the elevating frame 14 and the carriage assembly 16, moves as the composite traveling assembly 20 horizontally between an outboard deployed position and an inboard stowed position.

Figure 3:
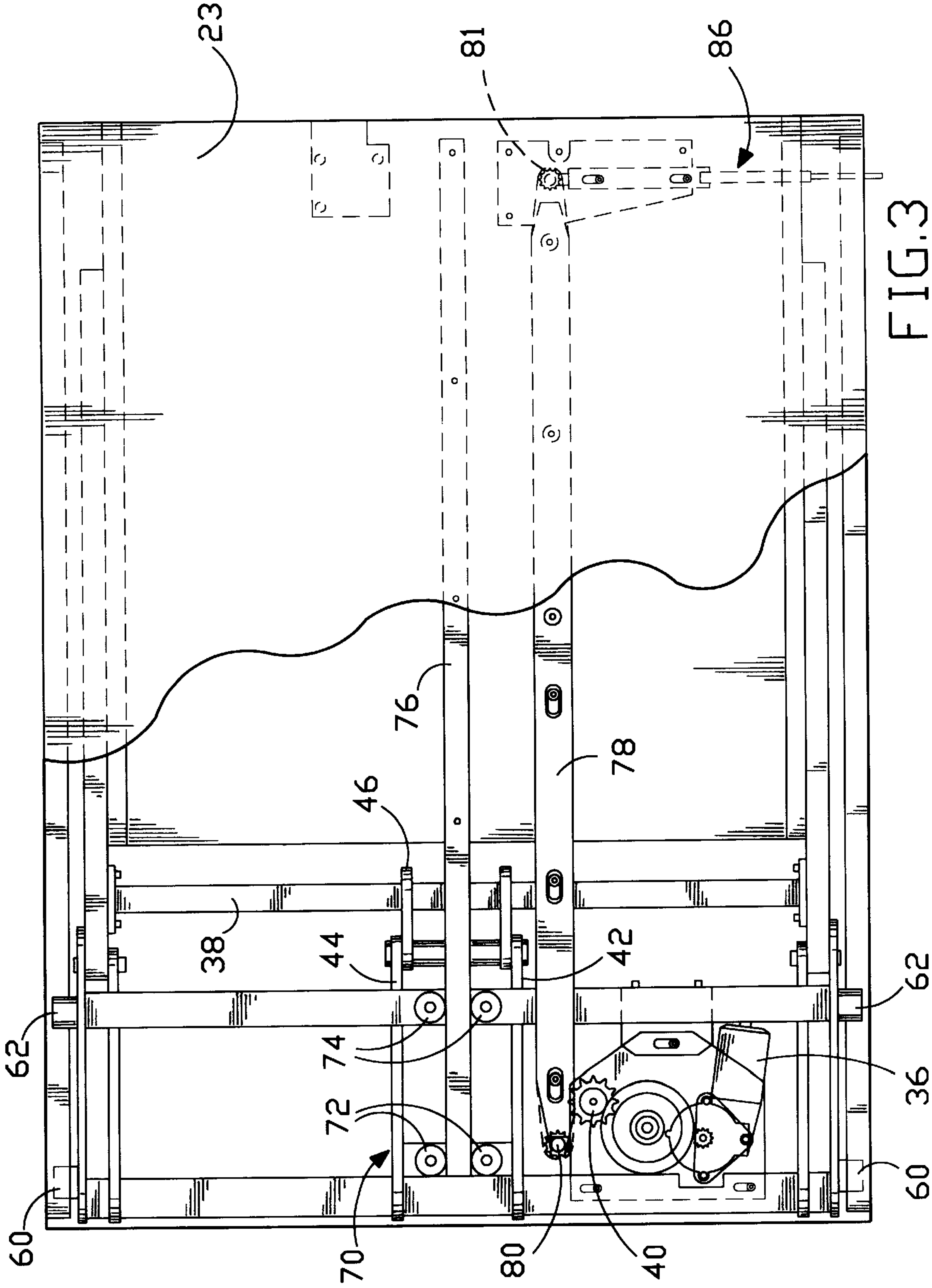
FIG. 3 is an enlarged partially cut-away top plan view of the present invention vehicle lift illustrated in FIG. 1.
Figure 4:
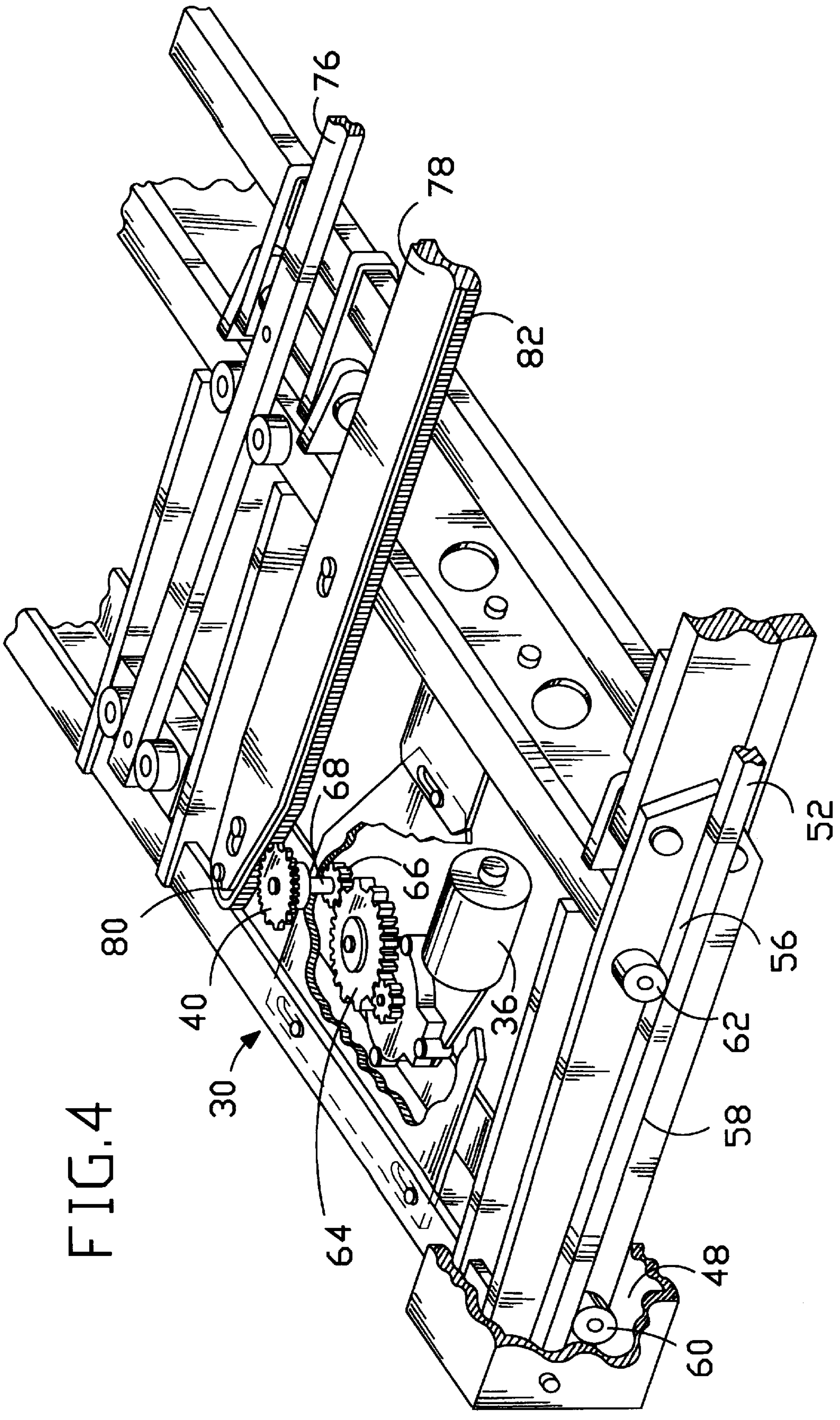
FIG. 4 is an enlarged partially cut-away perspective view of an improved driving mechanism of the present invention vehicle lift illustrated in FIG. 1.

Referring to FIGS. 3 and 4, the platform 12 along with the elevating frame 14 and the carriage assembly 16 move as the traveling assembly 20 moves into the mounting enclosure 18. The carriage assembly 16 has a pair of cam guide rails 52 and 54 (on the opposite side, not shown)and other moving members such as wheels 62 that operate the platform 12. Specifically, a pair of open, facing opposed horizontal channels 48 and 50 (on the opposite side, not shown) are located within the mounting enclosure 18. Referring to FIG. 4, there is shown a cut-away of the channel 48 open to face the opposed channel 50. Since the channels 48 and 50 are mirror images of each other, only the channel 48 and associated structure will be described in detail in the following disclosure, unless otherwise explicitly indicated.

The rail 52 is of a rectangular cross section to define upper and lower rail surfaces 56 and 58 and is centrally affixed in the channel 48 coextensive therewith. Various fastening techniques may be utilized or any suitable means known to one skilled in the art, to affix the guide rail 52 to the channel 48. The channel 48 and the rail 52 are rigid, thereby affording a linear bearing track to support the carriage assembly 16 by means of cam followers or wheels 60 and 62. The objective of this arrangement is to avoid the accumulation of foreign matter that may otherwise build up and interfere with the smooth motion of the cam followers 60 and 62 on surfaces 56 and 58.

A stop block 401 is attached to a side plate of the carriage assembly 16 for preventing the carriage assembly 16 from extending too far out of the mounting enclosure 18 (see FIG. 2).

Referring to FIGS. 3 and 4, the carriage assembly 16 further comprises a guiding assembly which includes a traveling bracket 70 with guide means such as two pairs of wheels 72, 74 and a longitudinal guide bar 76 which is affixed to the underside of the top panel 23 to cover the mounting enclosure 18 and is also used to operate the platform 12 and maintain the alignment of the platform 12 when deployed or stowed.

Essentially, in the stowage position, the platform 12 is horizontally aligned with the elevating frame 14, the carriage assembly 16 and the mounting enclosure 18. The platform 12 and the elevating frame 14 travel in and out of the mounting enclosure 18 by means of the carriage assembly 16. The traveling assembly 20 moves horizontally between a stowed position within the vehicle 2 and an outboard deployed position with only the carriage assembly 16 remaining within the vehicle 2 (see FIG. 3). The movement of the traveling assembly 20 between the stowed and deployed positions is powered by a driving mechanism 30 (see FIG. 4).

The driving mechanism 30 includes an electrical bidirectional motor 36 which is usually connected to the vehicle power source (not shown) and is mechanically coupled to a gear box 64 which in turn is coupled to a pinion 66 that is connected to a sprocket 40 by a shaft 68. A longitudinal chain bracket 78 is affixed to the underside of the top panel 23 of the mounting enclosure 18 and is located parallel to the longitudinal guide bar 76. At both ends of the longitudinal bracket 78 are sprockets 80 and 81 (see FIG. 3) which are coupled by a loop chain 82. The loop chain 82 is engaged with sprocket 40 and mounted to the bracket 78 and arranged in a horizontal plane. The sprocket 81 is coupled to a pinion 84 (see Figure) by a shaft 841 (not shown). The sprocket 81 is engaged with a manual spring biased locking mechanism 86 to prevent the sprockets 80 and 81 from rotating, and thereby prevents the chain 82 from moving linearly along the bracket 78. In this position, the vehicle lift 10 will be automatic. Accordingly, by activating the motor 36 the sprocket 40 moves along with the loop chain 82 thereby moves the traveling assembly 20 inward or outward with respect to the vehicle 2. One should notice that the sprocket 40 moves while the loop chain 82 does not, under the power control mode.

When the motor 36 is energized, it actuates the gear box 64 which in turn drives the pinion 66, which in turn rotates the sprocket 40 to linearly travel on the chain 82 moving the traveling assembly 20 to a deployed position as illustrated in FIG. 2. When the traveling assembly 20 is fully extended, the motor 36 is de-energized. The motor 36 may be energized to revolve in either direction to move the traveling assembly 20 between deployed and stowed positions.

Figure 5:
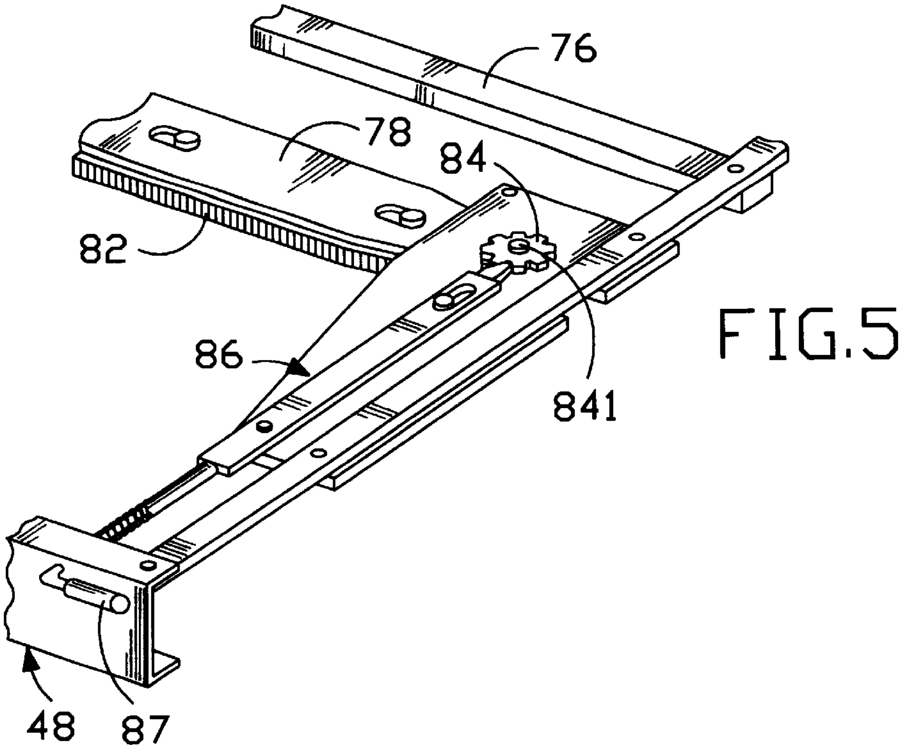
FIG. 5 is an enlarged partially cut-away perspective view of a manual release mechanism to disconnect the improved driving mechanism to permit manual operation of the traveling assembly to deploy and stow the platform.
Figure 6:
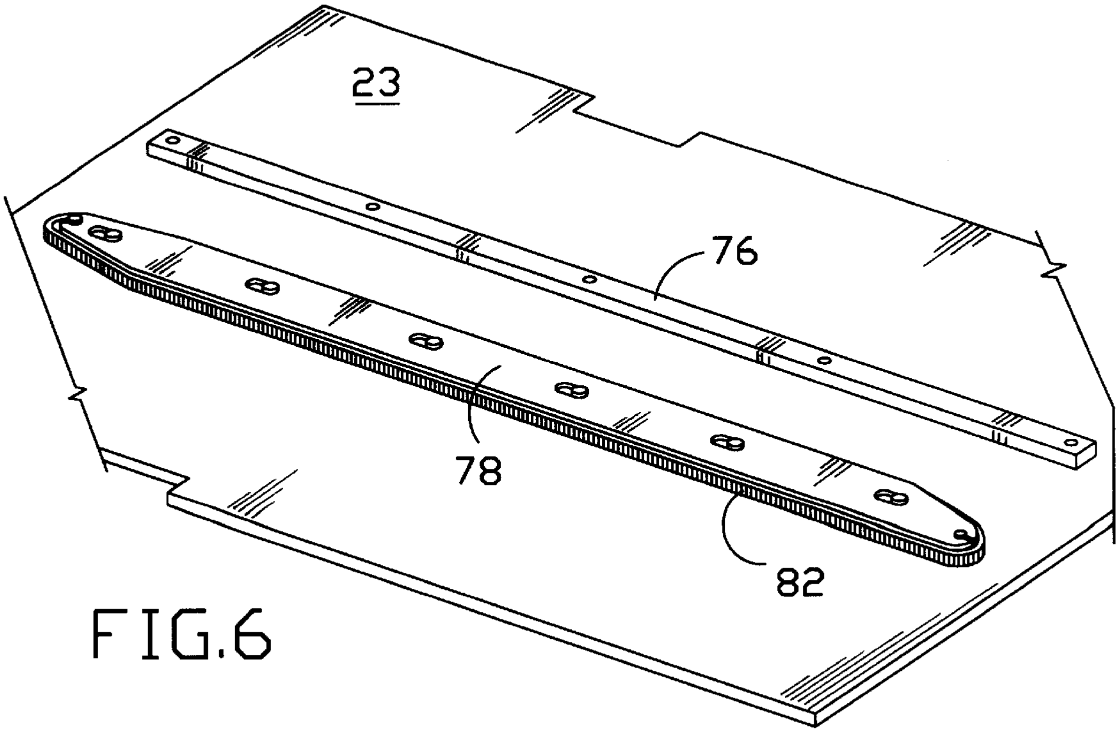
FIG. 6 is an enlarged perspective view of an underside of a top panel of the mounting enclosure, where a longitudinal bracket and a longitudinal guide bar are affixed thereto with a loop chain mounted to the bracket.

Referring to FIGS. 5 and 6, there is illustrated the manual spring biased locking mechanism 86 which is adapted to mount on the enclosure top panel 23 with spring biased level handle 83 which is releasibly engaged with pinion 84. To manually deploy and stow the traveling assembly 20, the spring biased locking mechanism 86 must disengage the pinion 84. An operator pulls the lever handle 87 away from the mounting enclosure 18, and thereby releases the pinion 84 which in turn releases the sprocket 81, where the loop chain 80 is then movable along the bracket 78 by the sprockets 80 and 81. The operator can then pull the platform 12 away from the mounting enclosure 18, and bypass the automatic operation of the vehicle lift 10. This arrangement is important to ensure the platform is still movable between the stowed and deployed positions even if the motor or the vehicle power becomes inoperable.

Referring to FIGS. 1 and 2, the elevating frame 14 extends between lateral outboard pivot locations 22 and inboard pivot locations 24 on the carriage assembly 16. As part of the elevating frame 14, two such similar laterally opposed parallelogram arrangements 26 and 28 are pivotally connected at opposite sides of the platform 12. The parallelogram arrangements 26 and 28 each comprise upper and lower parallel elements or bars. The parallelogram arrangements 26 and 28 are substantially identical to the '250 Patent, and the description thereof will not be described.

Referring to FIGS. 2 and 3, in order to pivotally actuate the elevating frame 14, for lowering and raising the platform 12, a cross bar 38 extends transversely, offset from the aligned pivot locations 24. The bar 38 is rigidly affixed between the parallelogram arrangements 26 and 28. One end of a hydraulic piston-cylinder ram (not shown) is pivotally anchored between support plates 42 and 44. The other end of the piston cylinder ram is pivotally anchored to the bar 38 by means of the bracket 46. When powered, the piston cylinder ram actuates at a pivot point to drive the parallelogram arrangements 26 and 28 to raise the elevating frame 14 in the arcuate path while the platform 12 is preserved substantially horizontal. When the lift is in the lowered position (see FIG. 1), the platform 12 inclines slightly downward as it extends outward. When the platform 12 is elevated, it is inclined slightly upward as it extends outward.

Generally, with the platform 12 in the ground level "G" (see FIG. 1, shown as lower dashed lines) the roll stop 32 has been actuated to the ramp position to provide a smooth transition surface, as for loading or unloading a wheelchair (not shown). With a wheelchair on the platform 12, the elevating frame 14 raises the platform 12 to the floor level "F" of the vehicle 2 (see FIG. 1, shown as upper dashed lines). As the platform 12 reaches vehicle floor level "F", a bridge plate 34 lowers automatically and the wheelchair may be rolled into the vehicle 2. Thereafter, the platform 12 is lowered to the stowed position of the aligned traveling assembly 20.

Referring to FIG. 2, the platform 12 comprises a horizontal flat platform surface bounded by lateral sides of the platform 12. A pair of handrails 90 and 92 (one raised and one lowered) are pivotally affixed at the corners defined between the platform surface and the lateral sides. The handrails 90 and 92 swing about a horizontal axis parallel to the defined corners of the lateral sides. Accordingly, movement is accommodated as indicated by the arrow 91 allowing the handrails to be lowered to stowage positions or raised to extend vertically as safety guards. While the handrails 90 and 92 are effective safeguards for persons in wheelchairs, they are also very significant for individuals who are physically impaired.

The outboard and inboard ends of the platform 12 with respect to the vehicle 2 (see FIG. 2) are terminated with a roll stop 32 and a bridge plate 34 which are actuated to provide a transition surface from the platform 12 either to ground level or to the vehicle floor. The roll stop 32 at the outboard end of the platform 12 is activated when the platform 12 is at ground level to provide smooth transition from the surface of the platform 12 to the ground. When the platform 12 is elevated from the ground, the roll stop 32 automatically pivots from a lowered ramp position to a raised or vertical safety stop position functioning to retain the wheelchair on the platform surface. The roll stop 32 is powered to be in the locked vertical mode when the platform 12 is not in contact with the ground. A latch mechanism supplements the powered operation to provide an electrical safeguard, i.e., the lift cannot be operated until the roll stop 32 is raised to the vertical safety stop position. The roll stop 32 functions with the bridge plate 34 to provide a peripheral safety barrier to the platform surface. The bridge plate 34 is mechanically activated by the motion of the elevating frame 14 and automatically provides a bridge between the platform 12 and the vehicle 2. It also functions as a vertical safety barrier at the inboard end of the platform 12.

It will be appreciated that the mounting enclosure 18, the carriage assembly 16, the elevating frame 14 and the platform 12 essentially are modular units to facilitate relatively easy replacement. That is, in the event of a component failure, one of the modular units can be replaced thereby rapidly returning a vehicle to service.

Hydraulic pressure supply systems and associated circuits and controls suitable for operating motor and actuator jacks in the manner and for the purpose described are or may be of conventional straightforward design employing well known and available components. Because understanding of this invention is not dependent upon nor is it limited to such design detail or upon operating steps and sequences nor upon the degree to which they may be automatically or manually started, stopped or controlled, all within the capability of everyday engineering skill, the present disclosure has not included such details.

Defined in detail, the present invention is a lift for use in conjunction with a vehicle, the lift comprising: (a) a platform movable between a stowage position and a deployed position; (b) a carriage pivotally coupled to the platform for moving the platform from the stowage position to the deployed position and inversely, the carriage including a bidirectional motor coupled to a gear box which in turn is coupled to a sprocket; (c) a mounting enclosure affixed to the vehicle and having a frame defining a space to receive the carriage and the platform; (d) a loop chain affixed and arranged in a horizontal plane and located relative to the sprocket; and (e) the motor driving the gear box which in turn rotates the sprocket to travel linearly along the loop chain to move the carriage and the platform from the stowage position to the deployed position and inversely.

Defined broadly, the present invention is a lift for use in conjunction with a vehicle, the lift comprising: (a) a platform movable between a stowed position and a deployed position; (b) a driving mechanism connected to the platform for moving the platform from the stowed position to the deployed position and inversely; (c) the driving mechanism including a driving means coupled to a gear box which in turn is coupled to a sprocket; (d) a chain affixed and arranged in a horizontal plane and located relative to the sprocket; and (e) the driving means driving the gear box which in turn rotates the sprocket to travel linearly along the chain to move the platform from the stowed position to the deployed position and inversely.

Defined more broadly, the present invention is a lift for use in conjunction with a vehicle, the lift comprising: (a) a platform movable between a stowed position and a deployed position; and (b) a driving mechanism arranged in a horizontal plane for moving the platform from the stowed position to the deployed position and inversely automatically or manually.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A lift for use in conjunction with a vehicle, the lift comprising:

a. a platform;

b. a driving mechanism connected to said platform for moving said platform between a stowed position and a deployed position and inversely;

c. a chain located relative to said driving mechanism and affixed at both ends by two sprocket means, and d. a locking mechanism for releasably engaging and disengaging one of said two sprocket means, the locking mechanism when engaged with one of said two sprocket means prevents said chain from moving such that said platform being automatically movable by said driving mechanism between its stowed and deployed positions, and the locking mechanism when disengaged with one of said two sprocket means allows said chain to move with said sprocket means, thereby allowing said platform to be manually movable by a person between its stowed and deployed positions.

2. The lift in accordance with claim 1 wherein said driving mechanism comprises a motor coupled to a gear box which in turn is coupled to a sprocket, where the motor drives the gear box which in turn rotates the sprocket to travel linearly along the chain to move said platform from its stowed and deployed positions.

3. The lift in accordance with claim 1 further comprising means for lowering said platform to a ground level and raising said platform a vehicle floor level.

4. The lift in accordance with claim 3 wherein said means includes a hydraulic piston-cylinder ram.

5. The lift in accordance with claim 1 further comprising a guiding assembly for maintaining the alignment of said platform when deployed or stowed.

6. The lift in accordance with claim 5 wherein said guiding assembly comprises a longitudinal guide bar and a traveling bracket with at least two pairs of opposite wheels engaging the guide bar.

7. The lift in accordance with claim 1 wherein said platform further comprises an inner platform stored within said platform.

8. A lift for use in conjunction with a vehicle, the lift comprising:

a. a platform;

b. a driving mechanism connected to said platform for moving said platform between a stowed position and a deployed position and inversely;

c. said driving mechanism including a driving means coupled to a gear box which in turn is coupled to a sprocket;

d. a chain located relative to said sprocket and affixed at both ends by a pair of sprockets;

e. said driving means driving said gear box which in turn rotates said sprocket to travel linearly along said chain to automatically move said platform from its stowed and deployed positions; and f. a manual spring biased locking mechanism for releasably engaging and disengaging a respective one of said pair of sprockets, the manual spring biased locking mechanism when engaged with the respective one of said pair of sprockets prevents said chain from moving such that said platform being automatically movable by said driving means between its stowed and deployed positions, and the manual spring biased locking mechanism when disengaged with the respective one of said pair of sprockets allows said chain to move with said pair of sprockets, thereby allowing said platform to be manually movable by a person between its stowed and deployed positions.

9. The lift in accordance with claim 8 further comprising means for lowering said platform to a ground level and raising said platform a vehicle floor level.

10. The lift in accordance with claim 9 wherein said means includes a hydraulic piston-cylinder ram.

11. The lift in accordance with claim 8 further comprising a guiding assembly for maintaining the alignment of said platform when deployed or stowed.

12. The lift in accordance with claim 11 wherein said guiding assembly comprises a longitudinal guide bar and a traveling bracket with at least two pairs of opposite wheels engaging the guide bar.

13. The lift in accordance with claim 8 wherein said platform further comprises an inner platform stored within said platform.

14. A lift for use in conjunction with a vehicle, the lift comprising:

a. a platform;

b. a carriage pivotally coupled to said platform for moving said platform between a stowed position and a deployed position and inversely, the carriage including a bidirectional motor coupled to a gear box which in turn is coupled to a sprocket;

c. a mounting enclosure affixed to said vehicle and having a frame defining a space to receive said carriage and said platform;

d. a loop chain located relative to said sprocket and affixed at both ends by a pair of sprockets;

e. said motor driving said gear box which in turn rotates said sprocket to travel linearly along said loop chain to automatically move said carriage and said platform from its stowed and deployed positions; and f. a manual spring biased locking mechanism for releasably engaging and disengaging a respective one of said pair of sprockets, the manual spring biased locking mechanism when engaged with the respective one of said pair of sprockets prevents said chain from moving such that said carriage and said platform being automatically movable by said motor between its stowed and deployed positions, and the manual spring biased locking mechanism when disengaged with the respective one of said pair of sprockets allows said chain to move with said pair of sprockets, thereby allowing said carriage and said platform to be manually movable by a person between its stowed and deployed positions.

15. The lift in accordance with claim 14 further comprising means for lowering said platform to a ground level and raising said platform a vehicle floor level.

16. The lift in accordance with claim 15 wherein said means includes a hydraulic piston-cylinder ram.

17. The lift in accordance with claim 14 further comprising a guiding assembly for maintaining the alignment of said carriage and said platform when deployed or stowed position.

18. The lift in accordance with claim 17 wherein said guiding assembly comprises a longitudinal guide bar and a traveling bracket with at least two pairs of opposite wheels engaging the guide bar.

19. The lift in accordance with claim 14 wherein said platform further comprises an inner platform stored within said platform.

* * * * *